| United States Patent [19] | [11] Patent Number: 4,933,162 |
| Vansant et al. | [45] Date of Patent: Jun. 12, 1990 |

[54] PROCESS FOR ULTRADRYING OF A GAS

[75] Inventors: Etiénne Vansant, Zoersel; Guido Peeters, Antwerp; Paul De Biévre, Kasterlee; Remi Van Gompel, Geel, all of Belgium; Giamcarlo Pierini, Varese; Heinz Dworschak, Cardana di Besozzo (Va), both of Italy

[73] Assignee: European Atomic Energy Community (EURATOM), Plateau du Kirchberg, Luxembourg

[21] Appl. No.: 188,117

[22] Filed: Apr. 25, 1988

Related U.S. Application Data

[63] Continuation of Ser. No. 855,095, Apr. 22, 1986, abandoned.

[30] Foreign Application Priority Data

May 1, 1985 [EP] European Pat. Off. ............ 85200678

[51] Int. Cl.$^5$ ..................... B01D 53/02; B01D 53/28; C01B 7/07
[52] U.S. Cl. ..................................... 423/488; 423/210
[58] Field of Search ...................... 423/210, 488, 580; 55/35, 75

[56] References Cited

U.S. PATENT DOCUMENTS

| 3,533,220 | 10/1970 | Espagno et al. | 55/75 |
| 3,536,521 | 10/1970 | McKinney et al. | 55/75 |
| 4,178,350 | 12/1979 | Collins et al. | 423/580 |
| 4,414,005 | 11/1983 | De Biévre et al. | 55/75 |
| 4,620,857 | 11/1986 | Vansant et al. | 55/75 |

*Primary Examiner*—Jeffrey E. Russell
*Attorney, Agent, or Firm*—Weingarten, Schurgin, Gagnebin & Hayes

[57] ABSTRACT

The invention concerns a process for ultra-drying of a gas or gas mixture by bringing this into contact with a silicate containing material.

In order to obtain a residual water level of 5 ppb or less, the invention is characterized in that the gas or gas mixture is brought into contact with a silcate containing material, preferably a zeolite or silicagel, that has been modified with silane, borane, and/or the alkyl and/or halogen substituted compounds thereof.

The invention is further concerned with the separation of tritium oxide from gas mixtures preferably with water.

9 Claims, No Drawings

PROCESS FOR ULTRADRYING OF A GAS

This application is a continuation of application Ser. No. 855,095, filed Apr. 22, 1986, now abandoned.

The invention is directed to a process for ultra-drying of a gas or gas mixture by bringing this into contact with a silicate containing material.

All of the zeolites have a high affinity for water and other polar molecules and can in general be used for removing water from gases and liquids and for general drying. Several industrial processes in chemical and petrochemical industries such as feedstock drying, LPG drying, natural gas drying, drying of air feed and many others use molecular sieves such as A, X and Y type zeolites, mordenite, clinoptilolite, etc.

However, in several applications coadsorption of other gases or components must be avoided. So for example the preferred zeolite for the dehydration of unsaturated hydrocarbon streams, such as cracked gas is potassium A (3A). It is also excellent for drying polar liquids such as ethanol, which are not coadsorbed.

Generally, zeolites have a high capacity for water. Large amounts of water can be removed effectively from a humid gas. However, if moisture levels of 1 ppm or less are required, only a small fraction of the capacity can be used.

The object of the present invention is to provide a process whereby water, which encompasses also tritium oxide, can be removed to a far greater extent from a gas or a gas mixture.

According to the invention a process for ultra-drying a gas or a gas mixture is characterized in that the gas or gas mixture is brought into contact with a silicate containing material that has been modified with silane, borane, and/or the allyl and/or halogen-substituted compounds thereof.

The silicate containing material is preferably chosen from the group consisting of zeolite and silicagel. More in particular mordenite, clinoptilolite or silicagel are used.

In the present application modified substrates are used for drying gases to $H_2O$ levels below 1 ppm, and for preventing coadsorption of other gases. One of the advantages of using modified zeolites is that these materials are acid resistant materials while A-type zeolites are not. In addition lower residual moisture can be obtained with modified substrates than with untreated zeolites.

As far as the use of silica gel as the silicate containing material is concerned, its capacity and affinity for water has been considerably increased in such extent by treatment that this material can now substitute the zeolites for many applications when highly tritiated water is used without any structural damage and properties decreasing.

It is to be noted, that in European patent application No. 49936, laid open to public inspection, it is described that modification of zeolites with silanes or boranes can be used for a controlled pore size reduction in such a way that the pores are closed for some molecules and inclusion or exclusion can be obtained. According to the present invention, some of the modified zeolites according to this application can be used.

The modification of the silicate-containing material consists of chemisorption of silane or borane or some of its alkyl- or halogen-substituted compounds:

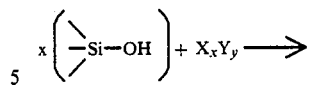

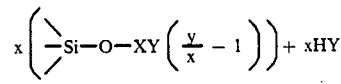

where $X=B$ or $Si$ and $Y=H$, F, Br, Cl, and/or $C_1$-$C_4$-alkyl.

More in particular the silane and/or borane modifying materials are chosen from the group of monosilane, dimethylsilane, monochloro-trimethylsilane, dichlorodimethylsilane, methyltrichlorosilane, diborane, borontrichloride and borontrifluoride.

In the case of the use of silicagel a preferred material for modification thereof is $BCl_3$.

The chemisorbed groups can be oxidized (hydrolized, alcoholized, . . . ) by reaction with oxygen, water, $C_1$-$C_4$ alkanol such as methanol, etc. For $H_2O$ for example the reaction is

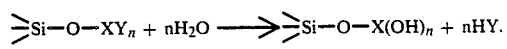

In the present application such a modification and pore size reduction are used for obtaining substrates with unaffected affinity for water, but from which other gases are excluded. If isotopic exchange with protons from the substrate must be avoided, the modified zeolite can be dehydroxylated by thermal treatment before using it as a drying agent. This finds application in the Fusion Technology Processes when large quantities of inert gases must be purified from tritiated water, which is a further embodiment of the present invention. It is also possible to use this process for separating water and tritium oxide from each other. This thermal dehydroxylation occurs along the following reaction:

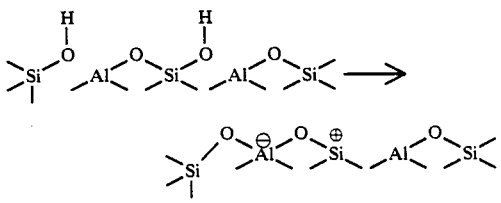

The affinity for water can be increased by using modified substrate in which the oxidation or hydrolysis step was not yet carried out. After the chemisorption of silanes or boranes (the hydrides or alkyl- or halogen-substituted derivatives) the substrate contains chemisorbed $-SiH_x$, $BH_x$, $-SiCl_x$, $-BCl_x$, groups which are still very reactive towards water. For example, if H-mordenite is reacted with diborane, it contains $-BH_x$ groups. When contacted with hydration water, the following quantitative reaction occurs:

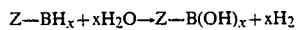

In some applications the evolved $H_2$ gives no problems, and in many cases it can be separated from the gas more easily than water would have been separated. However, halogenated silicon- or boron-compounds can also be used. For ultra-drying HCl for example BCl₃ treated substrates can be used:

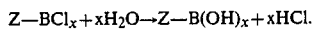

For other applications, other substituents can be used.

EXAMPLE 1

Nitrogen, containing 700 ppm of H₂O was sent at room temperature and with a flow of 100 l/hr through a 10 mm φ, 25 cm long column, containing 20 g H-mordenite. A residual water content of 0.7 ppm was obtained. The same test with boranated mordenite was carried out: the residual humidity was 0.3 ppm.

EXAMPLE 2

Nitrogen, containing 700 ppm of H₂O was sent at room temperature and with a flow of 100 l/hr through a 25 cm column with 10 mm φ, containing silicagel which was treated with BCl₃. A residual water content of 0.2 ppm was obtained.

EXAMPLE 3

HCl, containing 10 ppm of water, was sent at room temperature and with a flow of 100 l/hr through a column containing 1 kg H-mordenite. The residual water content was between 3 and 3.5 ppm. When the gas was sent at room temperature through an additional column of BCl₃-treated silicagel, the HCl was dried to 0.4 ppm.

EXAMPLE 4

When a gas stream of nitrogen, containing H₂S and H₂O is sent at room temperature through H-mordenite, also some of the H₂S is adsorbed. When mordenite, modified by boranation, hydrolysis and dehydration was used, only H₂O was removed. No retention for H₂S was observed.

We claim:

1. A process for drying gases, comprising the step of passing a water-containing gas stream over a modified silicate-containing material, hereafter termed the absorbent, said absorbent consisting essentially of the primary reaction product from the reaction of a silicate-containing material with at least one reagent selected from the group consisting of silane, borane, and substituted silanes and boranes containing at least one substituent selected from the group consisting of F, Cl, Br and alkyl groups of 1–4 carbon atoms; said reaction producing said primary reaction product generally according to the equation

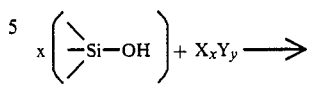

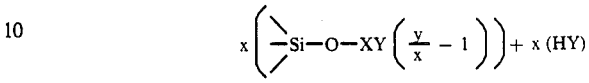

wherein
X is B or Si, and
Y is at least one material selected from the group consisting of H, F, Cl, Br, and alkyl groups containing 1 to 4 carbon atoms;
said gas stream coming into contact with said absorbent as an entering stream and passing from said absorbent as an exit stream;
water in said gas stream reacting with said absorbent, resulting in the water content of the exiting gas stream being substantially less than the water content of the gas stream entering said absorbent.

2. The process according to claim 1, wherein the silicate containing material is chosen from the group consisting of zeolites and silica.

3. The process according to claim 1, wherein the silane or borane modifying reagents are selected from the group consisting of monosilane, dimethylsilane, monochloro-trimethylsilane, dichlorodimethylsilane, methyltrichlorosilane, diborane, boron trichloride and boron trifluoride.

4. The process according to claim 1, further comprising subjecting said modified silicate-containing material to oxidation after said modifying step.

5. The process according to claim 1, wherein hydrochloric acid is the gaseous material to be dried.

6. The process according to claim 2 wherein the silicate-containing material is selected from the group consisting of mordenite, clinoptilolite, and silicagel.

7. The process according to claim 1 wherein the water to be removed from said gaseous material is tritium oxide.

8. The process of claim 1 wherein the water content of said gaseous material is reduced to below 1 ppm as a result of contacting said gaseous material with said modified silicate-containing material.

9. The process of claim 1 wherein the silicate-containing material is silica gel and the modifying reagent is BCl₃.

* * * * *